L. SACHSE.
Wheel-Plows.

No. 136,674.

Patented March 11, 1873.

UNITED STATES PATENT OFFICE.

LOUIS SACHSE, OF MONMOUTH, OREGON.

IMPROVEMENT IN WHEEL-PLOWS.

Specification forming part of Letters Patent No. 136,674, dated March 11, 1873.

*To all whom it may concern:*

Figure 1:
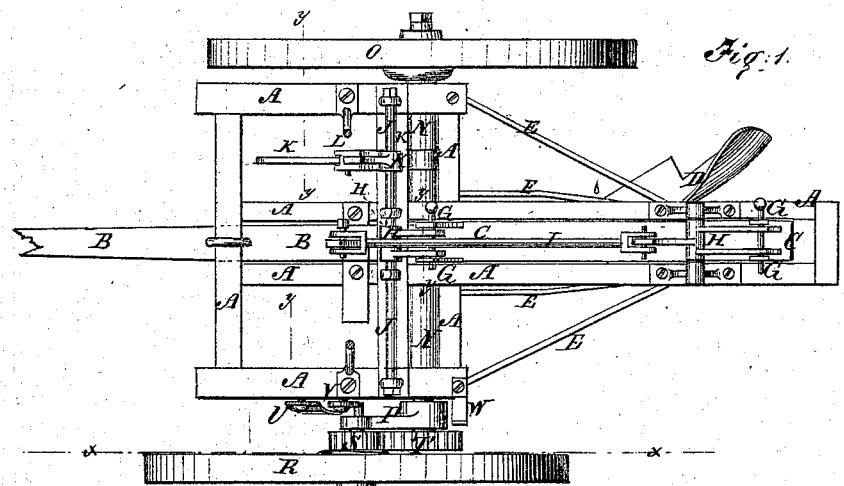
Figure 2:
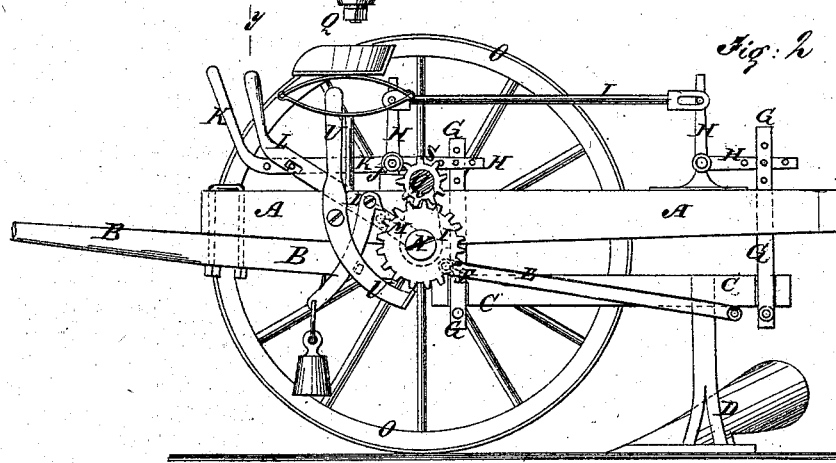
Figure 3:
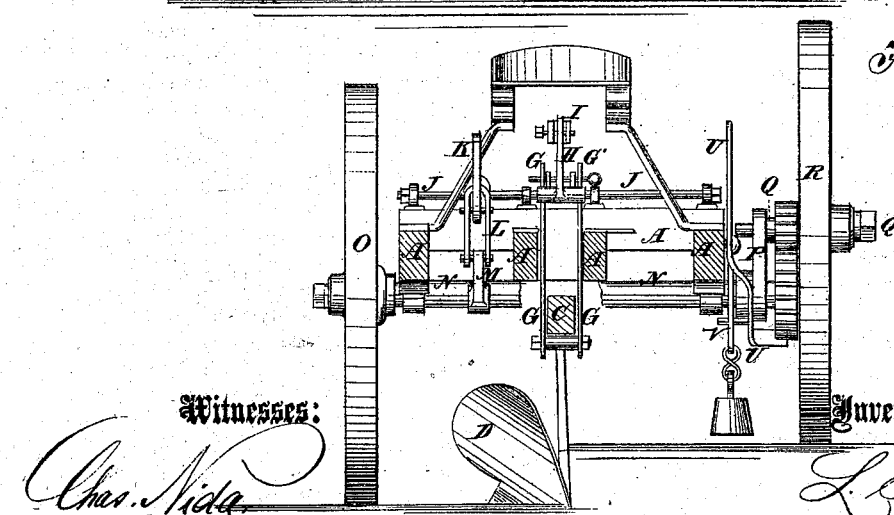

Be it known that I, LOUIS SACHSE, of Monmouth, in the county of Polk and State of Oregon, have invented a new and useful Improvement in Sulky-Plows, of which the following is a specification:

In the accompanying drawing, Figure 1 is a top view of my improved sulky-plow. Fig. 2 is a side view of the same, partly in section through the line $x\ x$, Fig. 1. Fig. 3 is a detail horizontal cross-section of the same taken through the line $y\ y$, Fig. 1.

Similar letters of reference indicate corresponding parts.

My invention has for its object to furnish an improved sulky-plow, which shall be so constructed that the plow may be raised out of the ground and the land-wheel lowered to a level with the furrow-wheel by the advance of the machine, which may be again lowered into working position by simply touching a lever, and which will allow the plow to be raised and lowered by hand, when desired, without affecting the position of the frame and wheels; and it consists in the construction and combination of various parts of the machine, as hereinafter more fully described.

A is the frame of the machine, the two central bars of which extend back sufficiently far, and are at a sufficient distance apart, to receive the plow-beam between them. The side bars of the frame A extend back only to the axle, and their rear ends are connected with the central bars by cross-bars. The rear ends of the central bars are connected by a short cross-bar, and the forward ends of the four bars are connected by a cross-bar. B is a tongue secured below the frame by a clamp over the front cross-piece and between the two central bars. C is the beam, to which the plow D is attached. The draft upon the plow-beam C is sustained by the rods E, the rear ends of which are secured to the rear part of the said beam C, and the forward ends of which are secured to the frame A at the rear ends of its side bars by a rod, F, which is secured to said frame by eyebolts or other convenient means. The two inner bars E extend forward nearly in straight lines, as shown in Fig. 1; but the outer bars incline outward as they pass forward, so as to serve also as braces. To each side of each end of the plow-beam C is secured the lower end of a strap, G. The straps G pass up through the space between the rearwardly-projecting parts of the central beams of the frame A, and are pivoted to the rear arms of the bent levers H by a pin or bolt, several holes being made in said straps and arms to receive the pivoting pin or bolt, to enable the plow to be conveniently adjusted to work at any desired depth in the ground. The levers H are made with two rearwardly-projecting arms and one forwardly-projecting arm. The forward arms are placed at right angles with the rear arms and opposite the space between said rear arms, as shown in Fig. 1. The forward arms of the two levers H are connected by a rod, I, the ends of which are slotted to receive the ends of the said arms. The pivoting-pin of the rear arm works in a short slot in the end of the rod I, so that the forward end of the plow-beam C may begin its upward and downward movement before the rear end, to cause the plow D to leave and enter the ground more readily. The rear lever H is pivoted at its angle to brackets or other supports attached to the rear parts of the central beams of the frame A. The forward lever H is keyed, or otherwise secured, at its angle to a rod or shaft, J, which works in bearings in eyebolts, pedestals, brackets, or other supports, attached to a cross-bar secured to the frame A a little in front of the rear ends of the side bars of the said frame A. To the rod J, near its end toward the plowed land-side of the machine, is keyed or otherwise secured a lever, K, which projects forward into such a position that it can be conveniently reached and operated by the driver from his seat, to raise and lower the plow. The lever K passes through the slot of a connecting link or bar, L, and has a pin attached to it, which enters a short slot in the link or bar L to lock the said lever and bar or link together, so that the lever may be operated by the movement of the bar or link. The bar or link L is notched at the forward side of the pivoting-pin slot, to allow the said lever K to be unlocked from the bar or link L when it is desired to raise and lower the plow by hand. The lower end of the bar or link L is pivoted to a short arm or lever, M, keyed or otherwise secured to the axle N, which works in bearings attached to the frame A. O is the furrow-wheel, which revolves upon the journal of the axle N. To the axle N, at the other side of the frame A, is screwed or otherwise secured a crank-arm, P, to the other end of which is screwed or otherwise secured a spindle, Q, upon which the land-wheel R revolves. To the inner end of the hub of the land-wheel R is attached a small gear-wheel, S, the teeth of which mesh into the teeth of a larger gear-wheel, T, that revolves upon a journal formed upon the end of the axle N. U is a lever, which is pivoted to the frame A, and the upper end of which extends up into such a position that it may be conveniently reached and operated by the driver from his seat. The lever U is made with an outward bend or off-set just below its pivoting point, and its lower end is bent outward to take hold of the teeth of the gear-wheel T and hold it stationary.

By this construction, when the crank-arm P is turned up into a vertical position, the land-wheel R will be raised, so that the frame A will be level while the furrow-wheel runs in the furrow; and when the crank-arm P is turned down into a horizontal position the land-wheel will be lowered, bringing both wheels to the same level. When the driver wishes to lower the land-wheel R to a level with the furrow-wheel O, he moves the upper end of the lever U forward, bringing its lower end into contact with the gear-wheel T, so that as the machine advances the gear-wheel S must roll around the said gear-wheel T, and bring the crank-arm P into a horizontal position. As the crank-arm P comes into a horizontal position its outer end strikes against the lever U and pushes it away from the gear-wheel T, so that the weight of the frame A and its attachments may lower the side of the frame A, and bring the arm P back to a vertical position. This last result is prevented, and the crank-arm P held in a horizontal position by the catch V, the upper end of which is pivoted to the frame A, and its lower end is weighted to hold it to its place.

Upon the rear edge of the upper part of the catch V is formed a projection, inclined upon its upper side and square upon its lower side. As the crank-arm P descends into a horizontal position the inwardly-projecting end of the spindle Q, or a pin attached to said crank-arm P, strikes against the inclined side of the projection of the catch V, and pushes the said catch forward, which is drawn back by its weighted lower end as soon as the spindle or pin has passed the said projection or shoulder, so that, as the wheel T is released from the lever U, as hereinbefore described, the crank-arm P will be held in a horizontal position by the catch V. To the lever U is attached a pin, in such a position as to be at the rear side of the lower part of the catch V, so that by moving the upper end of the lever U to the rearward, the catch V may be pushed forward, releasing the crank-arm P and allowing it to rise into a vertical position. The crank-arm P and the lever M are both rigidly attached to the axle N, so that as the crank P moves to lower or raise the wheel O, the plow-beam and plow may be raised or lowered at the same time. W is a stop attached to the frame A to prevent the crank-arm P from being ever carried back further than a vertical position.

Having thus described my invention, I claim as new and desire to secure by Letters Patent—

The wheels O R, having axles N Q, connected by crank-arm P, and provided with spur-wheels S T and lever U, in combination with the plow-frame A, as and for the purpose described.

LOUIS SACHSE.

Witnesses:
   IRA F. M. BUTLER,
   THERON A. IRELAND.